US011317045B2

(12) United States Patent
Posch et al.

(10) Patent No.: US 11,317,045 B2
(45) Date of Patent: Apr. 26, 2022

(54) EVENT-BASED IMAGE SENSOR AND OPERATING METHOD THEREOF

(71) Applicant: PROPHESEE, Paris (FR)

(72) Inventors: Christoph Posch, Bad Fischau (AT); Daniel Matolin, Freital (DE)

(73) Assignee: PROPHESEE, Paris (FR)

( * ) Notice: Subject to any disclaimer, the term of this patent is extended or adjusted under 35 U.S.C. 154(b) by 0 days.

(21) Appl. No.: 16/771,665

(22) PCT Filed: Dec. 11, 2018

(86) PCT No.: PCT/EP2018/084348
§ 371 (c)(1),
(2) Date: Jun. 10, 2020

(87) PCT Pub. No.: WO2019/115517
PCT Pub. Date: Jun. 20, 2019

(65) Prior Publication Data
US 2020/0396409 A1 Dec. 17, 2020

(30) Foreign Application Priority Data
Dec. 11, 2017 (EP) .................................... 17306740

(51) Int. Cl.
*H04N 5/3745* (2011.01)
*H04N 5/376* (2011.01)
(52) U.S. Cl.
CPC ......... *H04N 5/37452* (2013.01); *H04N 5/376* (2013.01); *H04N 5/37455* (2013.01)
(58) Field of Classification Search
CPC ........... H04N 5/37452; H04N 5/37455; H04N 5/376; H04N 5/341
See application file for complete search history.

(56) References Cited

U.S. PATENT DOCUMENTS

2002/0154233 A1* 10/2002 Yoshimura ......... H04N 5/37455
348/308
2018/0191972 A1* 7/2018 Berner ................... H04N 5/341

FOREIGN PATENT DOCUMENTS

EP 2695377 A1 2/2014
EP 2695377 B1 2/2014
(Continued)

OTHER PUBLICATIONS

International Search Report for PCT/EP2018/084348 dated Feb. 1, 2019 (2 pages).

*Primary Examiner* — Thanh Luu
*Assistant Examiner* — Monica T Taba
(74) *Attorney, Agent, or Firm* — Finnegan, Henderson, Farabow, Garrett & Dunner LLP (57) ABSTRACT

An event-based image sensor is provided that includes a plurality of pixel circuits. Each pixel circuit includes a photoreceptor circuit with a light-sensitive element configured for delivering at an output a photoreceptor current, an analog bus, and a bank of current memory cells connected to the analog bus. An output of the photoreceptor circuit is selectively connected to the analog bus. Each current memory cell is adapted to store an electric current flowing in the analog bus and to deliver an electric current stored within the current memory cell. Each pixel circuit may further include a current comparator including a current sign detector connected to the analog bus and configured for comparing a value of a compared electric current resulting from a difference between the photoreceptor current and a previous photoreceptor current stored in a current memory cell. At least one storage cell may also be provided that has a state conditioned by the output of the current sign detector.

17 Claims, 5 Drawing Sheets

(56) References Cited

FOREIGN PATENT DOCUMENTS

JP        H07 203319 A     8/1995
WO    WO2012175842 A1    12/2012

\* cited by examiner

EVENT-BASED IMAGE SENSOR AND OPERATING METHOD THEREOF

The invention relates to an event-based image sensor and an operating method thereof.

Conventional image sensors acquire the visual information time-quantized at a predetermined frame rate. Each frame carries the information from all pixels, regardless of whether or not this information has changed since the last frame has been acquired. This approach obviously results, depending on the dynamic contents of the scene, in a more or less high degree of redundancy in the recorded image data. The problem worsens as modern image sensors advance to ever higher spatial and temporal resolution. The hardware required for post-processing of the data increases in complexity and cost, demand on transmission bandwidth and data storage capacity surges and the power consumption rises, leading to severe limitations in all kinds of vision applications, from demanding high-speed industrial vision systems to mobile, battery-powered consumer devices.

One approach to dealing with temporal redundancy in video data is frame difference encoding. This simplest form of video compression includes transmitting only pixel values that exceed a defined intensity change threshold from frame to frame after an initial key-frame. Known frame differencing imagers rely on acquisition and processing of full frames of image data and are not able to self-consistently suppress temporal redundancy and provide real-time compressed video output. Furthermore, even when the processing and difference quantization is done at the pixel-level, the temporal resolution of the acquisition of the scene dynamics, as in all frame-based imaging devices, is still limited to the achievable frame rate and is time-quantized to this frame rate.

The adverse effects of data redundancy are most effectively avoided by not recording the redundant data in the first place and directly reducing data volume at the sensor output level. The immediate benefits are reductions in bandwidth, memory and computing power requirements for data transmission and post-processing, hence decreasing system power, complexity and cost. In addition, the frame-based, clocked principle of operation of conventional CMOS or CCD image sensors leads to limitations in temporal resolution as scene dynamics are quantized to the frame rate at which the pixel field of view is readout, and poor dynamic range.

The problem to be solved by the present invention is to provide an image sensor and the operating method thereof for the continuous acquisition of the full visual information of an observed dynamic scene with high temporal and intensity resolution, over a wide dynamic range (of recordable and processable light intensity) and thereby generating the minimum necessary amount of data volume. Thus, the generated data are not constituted by a succession of frames containing the image information of all pixels, but a stream of change and intensity (i.e. grey level) information of individual pixels, which are recorded and transmitted only if an actual change in light intensity in the field of view of the individual pixel has been detected by the pixel itself.

This method leads to a substantial reduction of generated data through complete suppression of the temporal redundancy in the picture information that is typical for conventional image sensors, though with the data containing the same, or even higher, information content. The picture element for an image sensor that implements the aforementioned method as well as the required asynchronous data readout mechanism can be realized on basis of electronic circuits. An image sensor with a multiplicity of such picture elements is typically realized and fabricated as an integrated system-on-chip e.g. in CMOS technology.

Implementing such a sensor and thus avoiding the above mentioned drawbacks of conventional image data acquisition would be beneficial for a wide range of artificial vision applications including industrial high-speed vision (e.g. fast object recognition, motion detection and analysis, object tracking, etc.), automotive (e.g. real-time 3D stereo vision for collision warning and avoidance, intelligent rear-view mirrors, etc.), surveillance and security (scene surveillance) or robotics (autonomous navigation. SLAM) as well as biomedical and scientific imaging applications. As the sensor operation is inspired by working principles of the human retina, one advantageous example application is the treatment of a degenerated retina of a blind patient with an implantable prosthesis device based on the data delivered by such a sensor.

A solution for achieving the aforementioned complete temporal redundancy suppression is based on pixel-individual pre-processing and acquiring of the image information, event-controlled and conditionally (i.e. only when changes in the scene have been detected). As explained below, the control of the image data acquisition is transferred to the pixel-level.

An electronic circuit, often call a transient detector, is used for detecting changes in lighting intensity received by the individual, autonomously operating pixels, for example in the case of an optical transient sensor, or dynamic vision sensor (DVS), as described in U.S. Pat. No. 7,728,269. However, such a transient detector circuit requires large switched-capacitors, and mismatch between voltage comparators used for assessing the changes may be problematic.

U.S. Pat. No. 8,780,240 discloses combining transient detector circuits, i.e. light exposure intensity changes detector circuits, and conditional exposure measurement circuits. A transient detector circuit individually and asynchronously initiates the measurement of a new exposure measure only if—and immediately after—a brightness change of a certain magnitude has been detected in the field-of-view of a pixel. Such a pixel does not rely on external timing signals and independently requests access to an (asynchronous and arbitrated) output channel only when it has a new grayscale value to communicate. Consequently, a pixel that is not stimulated visually does not produce output. In addition, the asynchronous operation avoids the time quantization of frame-based acquisition and scanning readout.

For each pixel circuit, the transient detector circuit monitors a photoreceptor voltage derived from a first photodiode for detecting relative voltage changes that exceed a threshold. Upon such detection, the transient detector circuit outputs a command for the exposure measurement circuit of the same pixel to start an absolute intensity measurement. i.e. an absolute grey level measurement. The exposure measurement circuit uses a second photodiode of the pixel, placed adjacent to the first photodiode, and derives its measure from the time duration for discharging the photodiode junction capacitance with the instantaneous photocurrent.

However, the pixel circuit disclosed in U.S. Pat. No. 8,780,240 is not optimal since time-based exposure measurement through direct photocurrent integration is only available after an unknown integration time. Furthermore, it often leads to a prohibitively long measurement time of a new exposure value, especially at low pixel illuminance levels, due to the corresponding small photocurrents. Finally using two separate photodiodes for change detection and exposure measurement leads to spatial divergence and motion direction dependency of the image data acquisition process, resulting in a reduction in imaging quality.

Patent application US 2016/0227135 A1 discloses a pixel circuit comprising:
- a front-end circuit comprising a single photodiode and having an output, said front-end circuit being configured for delivering on said output a photoreceptor signal derived from a light exposure of said single photodiode;
- a transient detector circuit configured for detecting a change in said photoreceptor signal delivered on said output;
- an exposure measurement circuit configured for measuring said photoreceptor signal delivered on said output upon detection by the transient detector circuit of a change in the photoreceptor signal, said exposure measurement circuit having a capacitor connected by a first switch to the output of the front-end circuit However, the exposure measurement is still available only after an unknown integration time in the exposure measurement circuit. In addition, mismatch between the outputs of the pixels may be problematic. For example, without a pixel mismatch correction method, direct use of the exposure measurement of a logarithmic photoreceptor circuit is problematic in an array of pixels.

U.S. Pat. No. 9,631,974 discloses a photoarray, comprising a plurality of cells, wherein each of said cells comprises:
- a means that is configured to generate a photocurrent being proportional to the intensity of the light impinging on the respective cell;
- a change detection circuit connected to the respective means for generating the photocurrent, which change detection circuit is configured to generate an output signal merely in case a change event occurs at which said intensity changes by a threshold amount;
- a brightness readout circuit that is configured so as to allow for reading a signal representing the brightness at the respective cell.

However, the photoarray uses conventional frame-based readout of the brightness (grey level) values with fixed exposure time. Brightness readout is not directly triggered by the change detection circuit of the individual pixels but is performed frame-wise from external control just like a conventional image sensor.

U.S. Pat. No. 9,528,738 discloses a pixel cell comprising a light change detector with a high-pass filter. However, mismatch between the outputs of the pixels may be problematic. For example, without a pixel mismatch correction method, direct use of the exposure measurement of a logarithmic photoreceptor circuit is problematic in an array of pixels.

SUMMARY OF THE INVENTION

The invention aims at providing an event-based image sensor with pixel circuits with smaller area requirements, allowing for larger array sizes or smaller sensor chip dimensions. The invention also aims at speeding up the individual measurement processes and consequently increasing temporal resolution. The invention also aims at avoiding spatial divergence between change detection and exposure measurement caused by a use of two separate photodiodes, improving measurement accuracy and consequently image quality. The invention also aims at providing exposure measurements immediately available after detection of a change, individually for each single pixel. The invention also aims at reducing mismatch between pixel circuits.

In this respect, the invention relates to an event-based image sensor comprising a controller, an address-event representation circuitry, and a plurality of pixel circuits forming a pixel array, the controller connected to each pixel circuit to control said pixel circuits, each pixel circuit comprising:
- a photoreceptor circuit comprising a light-sensitive element and having an output, said photoreceptor circuit being configured for delivering at said output a photoreceptor current derived from a light impinging on the light-sensitive element,
- an analog bus selectively connected to a readout unit, the output of the photoreceptor circuit being selectively connected to said analog bus,
- a bank of current memory cells connected to the analog bus, each current memory cell being adapted to selectively store an electric current flowing in the analog bus and to selectively deliver into said analog bus an electric current stored within said current memory cell;

wherein each pixel circuit comprises a current comparator configured for detecting a change in the photoreceptor current, said current comparator comprising:
- a current sign detector connected to the analog bus and configured for determining a sign of a value of an electric current flowing in the analog bus resulting from a compared electric current and a threshold current, said compared electric current resulting from a difference between at least the photoreceptor current and a previous photoreceptor current stored in a current memory cell,
- at least one storage cell connected to an output of the current sign detector and having a state conditioned by the output of said current sign detector, the state of said at least one storage cell being representative of a change between the photoreceptor current and the previous photoreceptor current greater than the threshold current;

wherein said at least one digital storage cell is connected to the address-event representation circuitry so that the address-event representation circuitry monitors the state of the storage cell to determine a change in the light impinging on the light-sensitive element, and wherein a readout of a pixel circuit through the connection of the analog bus to the readout unit is conditioned by the state of said at least one digital storage cell.

In contrast to prior art event-based image sensor, a pixel circuit here is a simpler circuit, that does not require large capacitors or switched capacitor circuits. In addition, the storage cell is used as a flag to indicate to the address-event representation circuitry that a change in the light has occurred, and the photoreceptor current is immediately available for a readout.

Other preferred, although non-limitative, aspects of the image sensor are as follows, isolated or in a technically feasible combination:

the current comparator comprises a first storage cell and a second storage cell, each connected to the output of the current sign detector and having a state conditioned by the output of said current sign detector, the state of the first storage cell representative of a value of the compared electric current greater than a value of a first threshold current, the state of the second storage cell representative of a value of the compared electric current lower than a value of a second threshold current;

the compared electric current is obtained by connecting a current memory cell storing the photoreceptor current and a current memory cell storing the previous photoreceptor to the analog bus, and storing it into a current memory cell, the threshold current being stored in another current memory cell:

the address-event representation circuitry is configured to determine an address of the pixel circuit whose digital storage cell has changed state upon detection of a change in a state of a digital storage cell of a pixel circuit;

the controller is configured for sending instructions to the pixel circuits, and wherein execution of at least one instruction by a pixel circuit is conditioned by a state of at least one storage cell;

the photoreceptor circuit a pixel circuit is a logarithmic photoreceptor circuit and the photoreceptor current is proportional to a logarithm of the light impinging on the light-sensitive element;

the event-based image sensor further comprises a calibration current source, and the photoreceptor circuit of a pixel circuit is configured for delivering at the output of said photoreceptor circuit a calibration current derived from a reference calibration current supplied by the calibration current source during a calibration procedure.

The invention also relates to a method of operating an event-based image sensor according to the invention, comprising a change detection cycle for detecting a change in light impinging onto a light-sensitive element of a photoreceptor circuit of a pixel circuit, said change detection cycle comprising the following steps:

a) the photoreceptor circuit delivers a photoreceptor current derived from a light exposure of the light-sensitive element at the output of said photoreceptor circuit and the photoreceptor current is written in a first current memory cell of the memory bank, b) a compared electric current resulting from a difference between the photoreceptor current and a previous photoreceptor current stored in a second current memory cell is stored in another current memory cell, c) the current sign detector compares a value of the compared electric current with a value of a threshold current stored in another current memory cell, and if the value of the compared electric current is above the value of the threshold current, the state of a digital storage cell is set in a first state, d) if the storage cell is in the first state, a readout of the photoreceptor current is performed, the photoreceptor current is written in the second current memory cell, and the state of the storage cell is set to a second state.

Other preferred, although non-limitative, aspects of the method are as follows, isolated or in a technically feasible combination:

a current comparator of the pixel circuit comprises a first storage cell and a second storage cell, each connected to the output of a current sin detector of the current comparator and having a state conditioned by an output of said current sign detector, the state of the first storage cell representative of a value of the compared electric current greater than a value of a first threshold current, the state of the second storage cell representative of a value of the compared electric current lower than a value of a second threshold current, wherein step c) is composed of the following steps:

c1) the current sign detector compares a value of the compared electric current with a value of a first threshold current stored in a fourth current memory cell, and if the value of the compared electric current is above the value of the first threshold current, the state of the first storage cell is set in a first state, c2) the current sign detector compares a value of an opposite of the compared electric current with a value of a second threshold current stored in a fifth current memory cell, and if the value of the opposite of the compared electric current is above the value of the second threshold current, the state of the second storage cell is set in a first state; —during a readout procedure of the pixel array, only pixel circuits that have a storage cell is a first state are selected to have their photoreceptor current read;

the method comprises a calibration procedure executed before step d) of the detection cycle, said calibration procedure comprising the following steps:

connection of a calibration current source instead of a light-sensitive element in a photoreceptor circuit of a pixel circuit so that the photoreceptor circuit of the pixel circuit delivers at the output of said photoreceptor circuit a calibration current derived from a reference calibration current supplied by the calibration current source, transferring the calibration current from the output of said photoreceptor circuit to a sixth current memory cell where said calibration current is stored;

during a readout of a pixel circuit, the calibration current stored in the sixth current memory cell is subtracted from the photoreceptor current.

BRIEF DESCRIPTION OF THE DRAWINGS

Other aspects, objects and advantages of the present invention will become better apparent upon reading the following detailed description of preferred embodiments thereof, given as non-limiting examples, and made with reference to the appended drawings wherein.

In all figures, the same reference characters refer to same or similar elements.

DETAILED DESCRIPTION OF THE INVENTION

Figure 1:
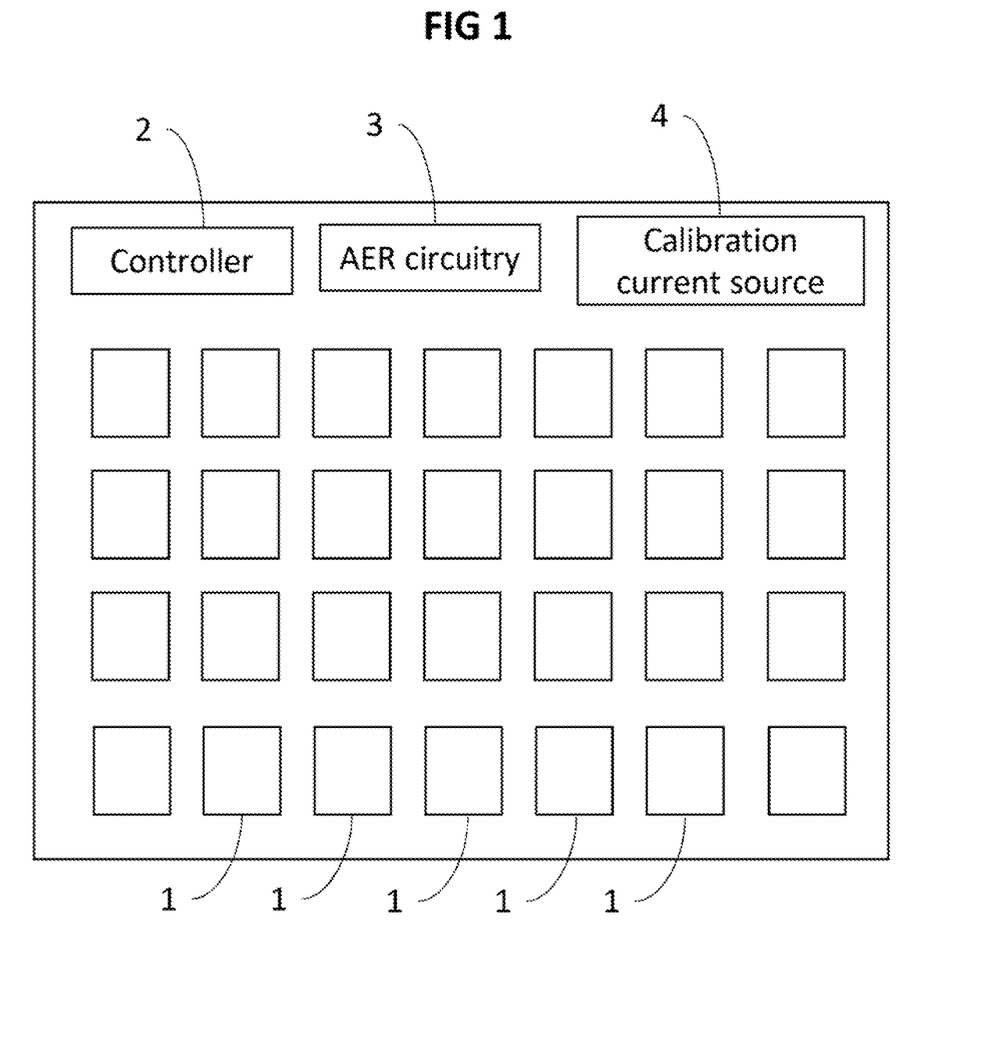
FIG. 1 shows a simplified diagram of an event-based image sensor according to a possible embodiment of the invention.

A simplified diagram of an event-based image sensor according to a possible embodiment is shown in FIG. 1. The event-based image sensor comprises a plurality of pixel circuits 1 forming a pixel array. FIG. 1 shows a limited number of pixel circuits 1 for clarity's sake. It is understood that the pixel array comprises a large number of pixel circuits 1, with dimensions exceeding 256×256 pixels for example. The event-based image sensor comprises a controller 2, an address-event representation (AER) circuitry 3 and may also comprise a calibration current source 4.

The controller 2 is configured for sending instructions to the pixel circuits 1 in order to controls the pixel circuits 1. According, the pixel circuits are connected to the controller 2. The controller 2 is configured to send the same instruction at the same time to all the pixel circuits 1. The controller 2 and the pixel circuits 1 form a single instruction, multiple data (SIMD) processing architecture.

Figure 2:
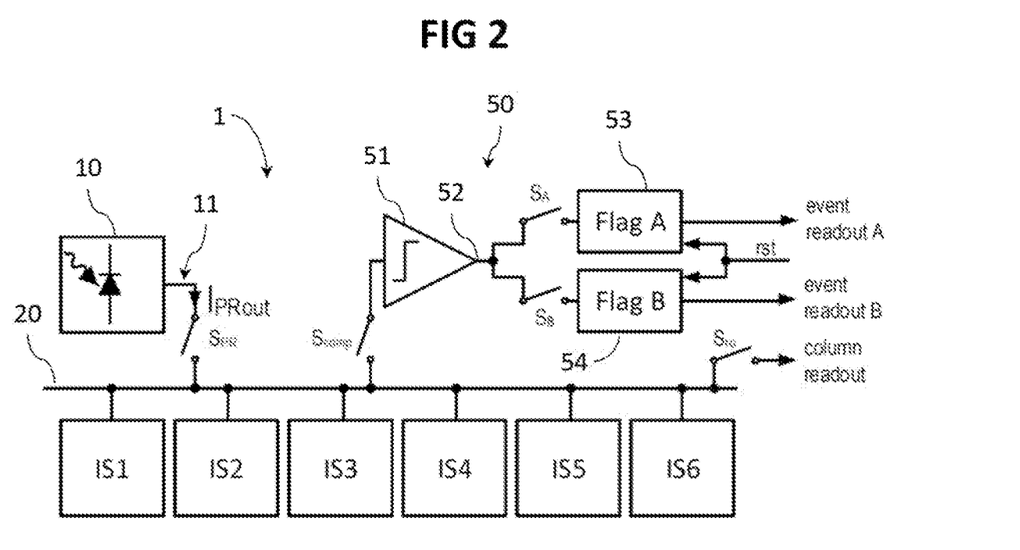
FIG. 2 shows a simplified diagram of a pixel circuit according to a possible embodiment of the invention.

An example of a pixel circuit 1 is illustrated on FIG. 2. A pixel circuit comprises a photoreceptor circuit 10 having an output 11 and configured for delivering at said output 11 a photoreceptor current. The photoreceptor current is derived from light impinging a light-sensitive element of the photoreceptor circuit.

Figure 3:
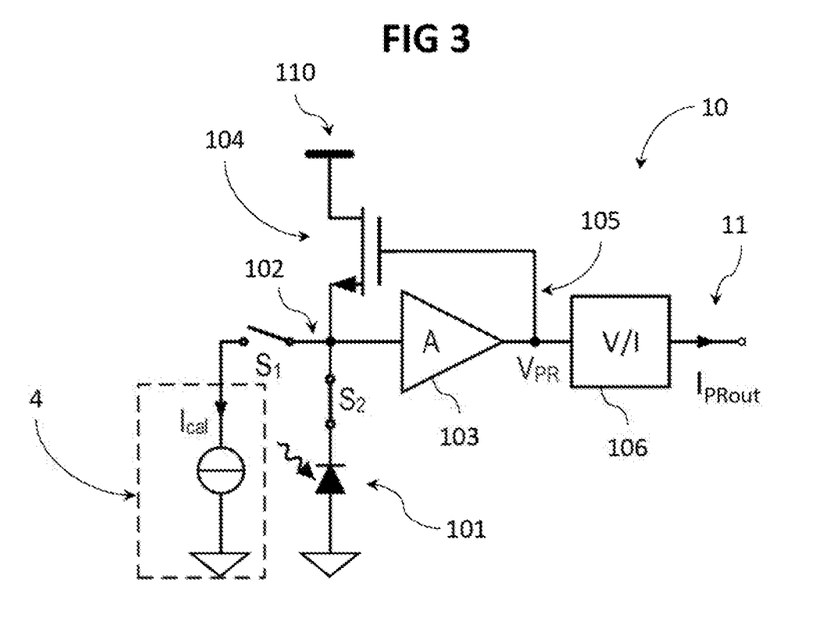
FIG. 3 shows a simplified diagram of an exemplary possible embodiment of a photoreceptor circuit.

FIG. 3 shows an example of a photoreceptor circuit 10 that may be used. The photoreceptor circuit 10 is a logarithmic photoreceptor circuit, and the photoreceptor current $I_{PRout}$ is proportional to a logarithm of the light impinging on the light-sensitive element 101. The photoreceptor circuit 10 comprises a light-sensitive element 101 such as a photodiode, which is connected to ground and via a switch $S_2$ to an input 102 of an inverting amplifier 103. A N-type MOSFET transistor 104 has its drain connected to a supply voltage terminal 110, and its source connected to the input 102 of the inverting amplifier 103. The output 105 of the inverting amplifier 103 is connected to the gate of the transistor 104. The inverting amplifier 103 delivers at its output 105 a photoreceptor voltage $V_{PR}$ derived from the light exposure of the light-sensitive element 101. The output of the inverting amplifier 103 is also connected to the input of a voltage-to-current (V/I) converter 106 that converts the photoreceptor voltage $V_{PR}$ into the photoreceptor current $I_{PRout}$ that is delivered on the output 11 of the photoreceptor circuit 11 constituted by the output of the voltage-to-current converter 106. The calibration source 4 can be connected to the input 102 through a switch S1 for delivering a reference current $I_{cal}$ to the input 102.

Other kinds of photoreceptor circuit 10 may be used. For example, the photoreceptor circuit may be a linear photoreceptor circuit 10 which delivers a current linearly proportional to the light impinging on the light-sensitive element 101. Preferably, the photoreceptor current $I_{PRout}$ may also be a current derived from a voltage at a capacitor resulting from an integration over a given amount of time of the current flowing through the light-sensitive element 101, as described in the prior art references cited above. It is also possible to combine in a same pixel circuit a logarithmic photoreceptor circuit with another photoreceptor circuit provided with an integrating capacitor.

The pixel circuit also comprises an analog bus 20 wherein electric currents can flow. The output 11 of the photoreceptor circuit 10 is connected to said analog bus 20 through a front-end switch $S_{PR}$. The analog bus 20 is connected to a current readout unit. More precisely, a readout switch $S_{ro}$ connects analog bus 20 to said current readout unit. The switch $S_{ro}$ is closed when the pixel circuit is selected to be read. The current readout unit is for example a column current readout unit. The current readout unit may include a current-to-voltage converter block to which the electric current flowing in the analog bus of a selected pixel circuit is routed, and an analog-to-digital converter (ADC).

The pixel circuit 1 also comprises a bank of memory cells $IS_i$ (with i=1 . . . 6) connected to the bus. In the depicted embodiment, the bank of memory cells $IS_i$ comprises six memory cells $IS_i$. However, the number of memory cells $IS_i$ in the bank may vary. The number of memory cells $IS_i$ is preferably greater than or equal to four, and more preferably greater than or equal to five, and even more preferably greater than or equal to six. Each memory cell $IS_i$ is adapted to selectively store an electric current flowing in the analog bus and to selectively deliver into said analog bus 20 an electric current stored within said memory cell $IS_i$.

Figure 4:
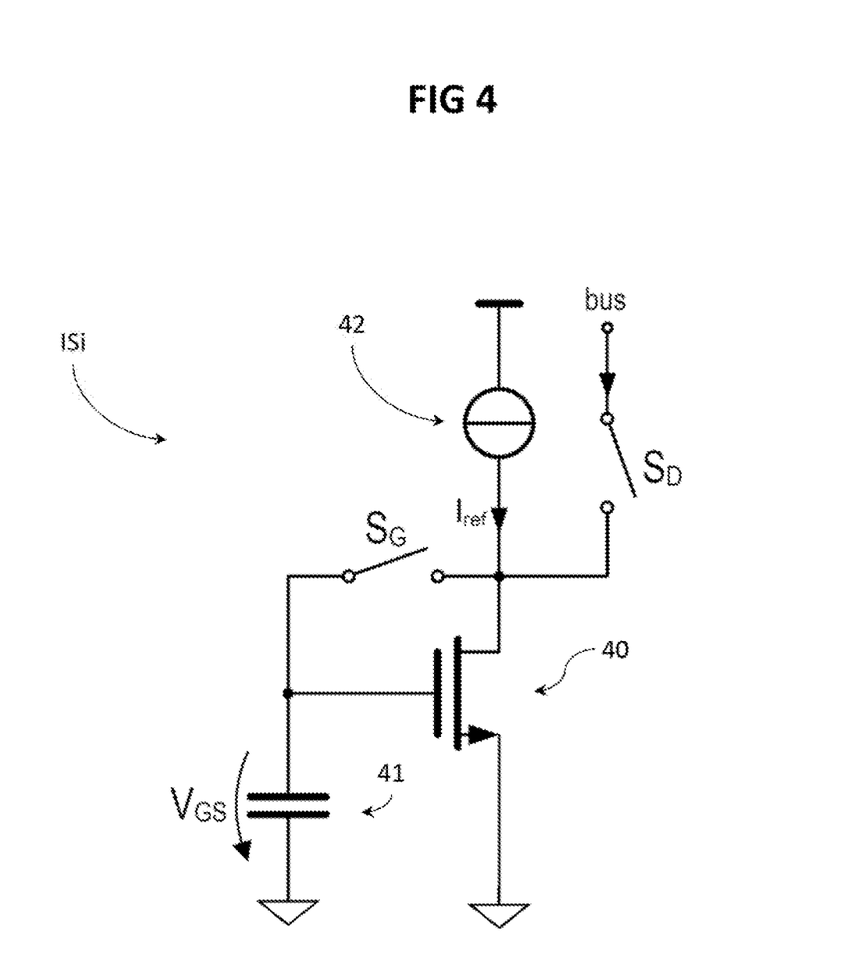
FIG. 4 shows a simplified diagram of an exemplary possible embodiment of a memory cell.

FIG. 4 shows a schematic example of a current memory cell $IS_i$ that can be used in a pixel circuit 1. The memory cell $IS_i$ comprises an N-type field-effect transistor 40 (e.g. MOSFET), with a source at ground. A capacitor 41 has a first terminal connected to the ground and a second terminal connected to the gate of the transistor 40. Accordingly, the voltage $V_{GS}$ across the capacitor 40 corresponds to the voltage between the gate and the source of the transistor 40. The second terminal of the capacitor 41 is also connected to the drain of the transistor 40 through a gate switch $S_G$. The drain of the transistor 40 is connected to the analog bus 20 through a drain switch $S_D$. When the drain switch $S_D$ is closed, the memory cell $IS_i$ is connected to the analog bus 20. A current source 42 is connected to the drain of the transistor 40 and allows a reference current $I_{ref}$ to flow in both directions. The current source 42 may be outside the memory cell $IS_i$, and may be shared by the memory cells $IS_i$ of the bank of a pixel circuit, or by the memory cells $IS_i$ of the whole pixel array. Other types of current memory cell $IS_i$ can be used. For instance, the article of J. B. Hughes and K. W. Moulding "S2I: A switched-current technique for high performance", Electron, Lett., vol. 29, no. 16, pp. 1400-1401, August 1993

When the drain switch $S_D$ and the gate switch $S_G$ are closed, the voltage $V_{GS}$ takes the value required for an electric current to flow flowing from the analog bus 20 through the transistor 40. The incoming electric current is thereby written in the memory cell $IS_i$. When the drain switch $S_D$ and the gate switch $S_G$ are open, the voltage $V_{GS}$ keeps a constant value. The electric current is stored in the memory cell $IS_i$. When the gate switch $S_G$ is open and the drain switch $S_D$ is closed, the voltage $V_{GS}$ at the gate of the transistor 40 is kept (because the gate switch $S_G$ is open), but the electric current flows (because of the voltage $V_{GS}$ at the gate of the transistor 40) to the analog bus 20. The electric current is read from the memory cell $IS_i$.

Since the pixel circuit 1 comprises several current memory cells $IS_i$ connected to the same analog bus 20, it is possible to perform arithmetic operations on electric currents, by writing, storing and reading said electric currents. Furthermore, electric currents can be inverted and copied from one current memory cell $IS_i$ to another current memory cell $IS_i$. The results of these arithmetic operations are also electric currents that can be stored in the current memory cells $IS_i$. These operations simply follow Kirchhoff's current law.

For example, to perform an addition of two electric currents respectively stored in two memory cells, said two memory cells just have to be connected to the analog bus 20 and read at the same time (i.e. by closing the drain switches $S_D$ and keeping the gate switch $S_G$ open). The resulting current may be written in another current memory cell at the same time (by opening both the drain switches $S_D$ and the gate switch $S_G$).

It shall be noted that when a current memory cell $IS_i$ is read from and another current memory cell $IS_i$ is writing, the electric current from the read current memory cell and entering the analog bus 20 is the opposite of the electric current leaving the analog bus 20 to be written, according to Kirchhoff's current law. As a consequence, for the analog bus 20, a basic transfer operation between two current memory cells $IS_i$ includes a negation of the value of the transferred electric current (i.e. of the intensity of the transferred electric current). As a consequence, it is possible to substrate a value of a first electric current from a value of a second electric current by transferring first electric current from one current memory cell to another current memory cell before adding the two electric currents.

The pixel circuit 1 also comprises a current comparator 50 configured for detecting a change in the photoreceptor current $I_{PRout}$. The current comparator 50 comprises a current sign detector 51 with an input connected to the analog bus 20 by a comparator switch $S_{comp}$. The current sign detector 51 is configured to determine the sign of the value of the electric current (i.e. the direction of the current) flowing in the analog bus 20. Preferably, the current sign detector 51 is configured to output a value only when the current at its input (i.e. through the comparator switch $S_{comp}$) is positive.

The current comparator 50 also comprises two storage cells 53, 54 connected to the output 52 of the current sign detector 51. A first storage cell 53 is connected through a first flag switch $S_A$ and constitutes a first flag A. A second storage cell 54 is connected through a second flag switch $S_B$ and constitutes a second flag B. The storage cells 53, 54 can have two states, a first state designated as "TRUE", and a second state designated as "FALSE". The default state of a storage cell 53, 54 is "FALSE". A storage cells 53, 54 keeps its state until said storage cell 53, 54 is reset. A reset signal rst can be provided to the storage cells 53, 54 to force them into the second state (i.e. FALSE). The storage cells 53, 54 can therefore be considered as latches. The storage cells 53, 54 can also be called digital storage cell because they can only have two states that can be construed as binary values.

The two digital storage cells 53, 54 are connected to the address-event representation circuitry 3. The address-event representation circuitry 3 monitors the states of the digital storage cells 53, 54 of all the pixel circuits 1.

Figure 5:
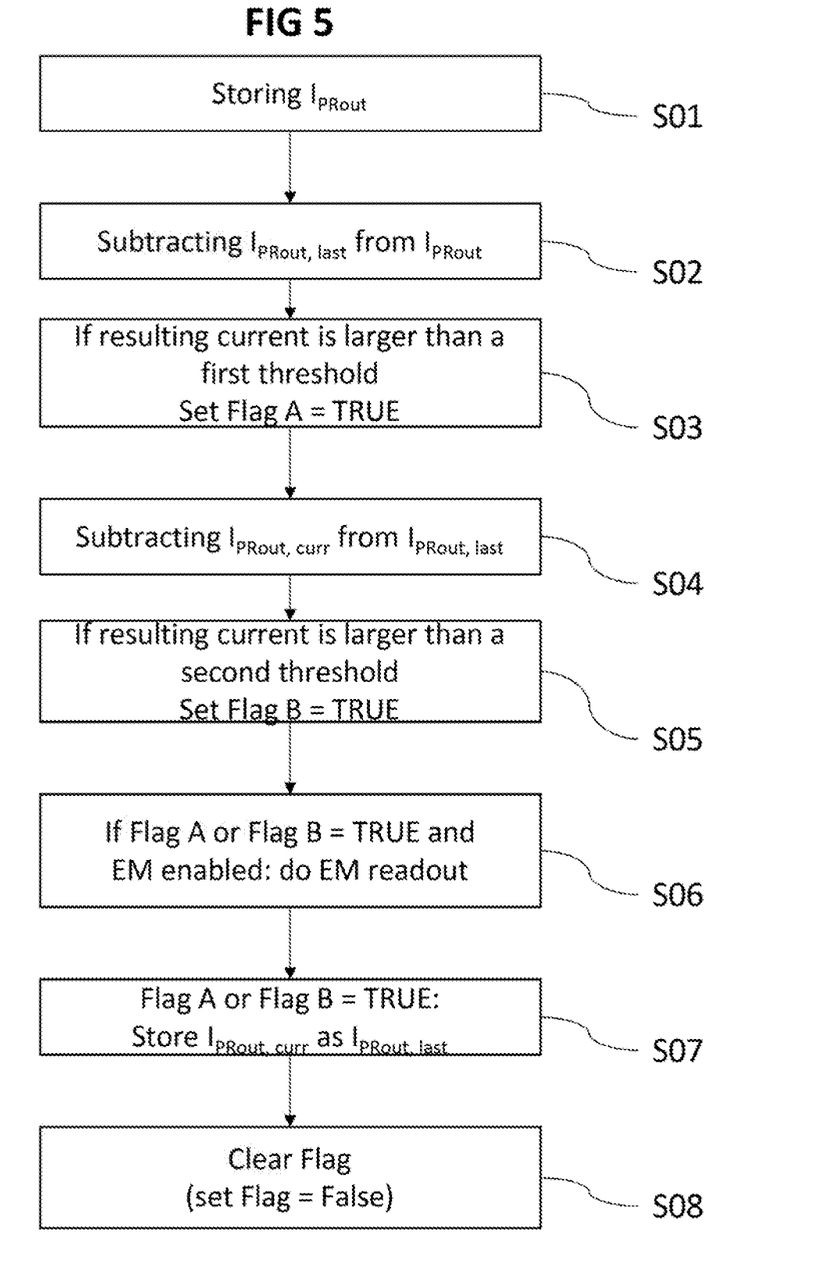
FIGS. 5 and 6 show diagrams of a method of operating a pixel circuit according to a possible embodiment of the invention.
Figure 6:
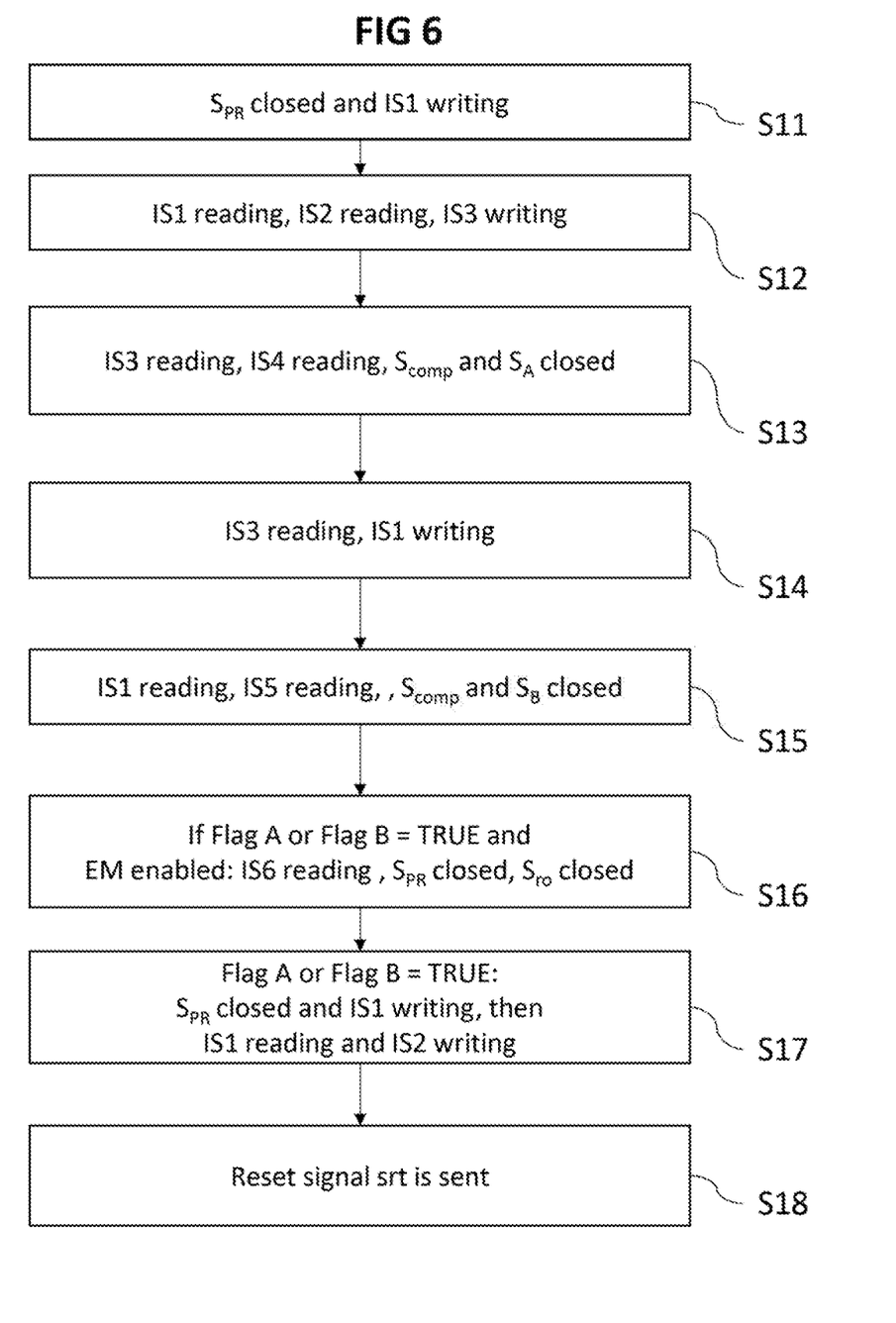

In reference to FIGS. 5 and 6, a detection cycle of a pixel circuit 1 is described herein below. FIGS. 5 and 6 show different aspect of the same cycle: FIG. 5 shows how the electric current are used, and FIG. 6 shows how the switches and current memory cells $IS_i$ are used. In the steps of the following description, when a memory cell $IS_i$ is in writing mode, the drain switch $S_D$ and the gate switch $S_G$ of said memory cell $IS_i$ are closed. When a memory cell $IS_i$ is in reading mode, the drain switch $S_D$ of said memory cell $IS_i$ is closed while the gate switches $S_G$ is kept open. When a memory cell $IS_i$ is in an idle mode, i.e. neither in writing mode nor in reading mode, the drain switch $S_D$ and the gate switch $S_D$ are open. A memory cell $IS_i$ in idle mode is disconnected from the analog bus 20 and stores an electric current. If a current memory cell $IS_i$ is not mentioned during a step, the current memory cell $IS_i$ should be considered in idle mode. Unless mentioned otherwise, the switches and therefore the operations of the steps of the change detection cycle are controlled by the instructions sent by the controller 2. The same instruction is sent at the same time to all the pixel circuits 1 by the controller 2.

In a first step S01, the photoreceptor circuit 10 delivers a photoreceptor current $I_{PRout}$ derived from a light exposure of the light-sensitive element 101 at the output 11 of said photoreceptor circuit 10, and the photoreceptor current $I_{PRout}$ is written in a first current memory cell $IS_1$ of the memory bank. More precisely, the front-end switch $S_{PR}$ is closed (step S11), connecting the output 11 of the photoreceptor circuit 10 to the analog bus 20. The photoreceptor current $I_{PRout}$ therefore flows into the analog bus 20. The first current memory cell $IS_1$ is in writing mode so that the photoreceptor current $I_{PRout}$ is written in the first current memory cell $IS_1$. The front-end switch $S_{PR}$ is then opened.

In step S02, a previous photoreceptor current $I_{PRout, last}$ stored in a second current memory cell $IS_2$ is subtracted from the photoreceptor current $I_{PRout}$ stored in the first current memory cell $IS_1$, resulting in a compared electric current which is stored in a third current memory cell $IS_3$. More precisely, the first current memory cell $IS_1$ and the second current memory cell $IS_2$ are in reading mode and the third current memory cell $IS_3$ is in writing mode (step S12). Since a reading a memory cell $IS_i$ after writing an electric current in said memory cell $IS_i$ reverses the flowing direction of the electric current on the analog bus 20, it reverses the sign of the value of the electric current. As a result, the electric current read from the first current memory cell $IS_1$ has a value of $-I_{PRout}$. By reading the first current memory cell $IS_1$ and the second current memory cell $IS_2$ at the same time, the compared electric current written in the third current memory cell $IS_3$ has a value of $-I_{PRout}+I_{PRout, last}$.

In step S03, the current sign detector 51 compares a value of the first compared electric current with a value of a first threshold current stored in a fourth current memory cell IS4. The state of the first digital storage cell 53 will depend from the result of the comparison. To do so (step S13), the third current memory cell IS3 and the fourth current memory cell IS4 are in reading mode in order to send to the analog bus 20 the first compared electric current of value $-(-I_{PRout}+I_{PRout, last})$, noted $I_{compared}$, and the first threshold current, respectively. For instance, if the photoreceptor current has a value of $I_{PRout}=1.11$ µA, and the previous photoreceptor current has a value of $I_{PRout, last}=1$ µA, the compared electric current has a value of $I_{compared}=0.11$ µA. It shall be noted that the example of current values are given here and below as a mere illustration and may not reflect the actual current values used in embodiments of the invention.

The resulting electric current on the analog bus 20 therefore shows a value of $I_{compared}+I_{thA}$, where $I_{tha}$ is the value of the first threshold current. The comparator switch $S_{comp}$ is closed in order to connect the current sign detector 51 to the analog bus 20. The first flag switch $S_A$ is also closed to connect the first storage cell 53 to the output 52 of the current sign detector 51. For comparing the value of the compared electric current $I_{compared}$ flowing in the analog bus 20 with the value of the first threshold current $I_{thA}$, the current sign detector 51 is configured to determine a sign of the current (i.e. sign of the intensity or value of the current) of the resulting electric current flowing in the analog bus 20. If the value of the resulting electric current is positive, $I_{compared}+T_{thA}$ is positive, which means that the value of the first compared electric current $I_{compared}$ is greater than the opposite of the value of the first threshold current $I_{thA}$. This means that a positive change between the photoreceptor current and the previous photoreceptor current is greater than the opposite of the first threshold current, and therefore that the light impinging on the light-sensitive element 101 has increased since a previous change detection cycle. This change is thus detected. For example, if $I_{tha}=-0.1$ µA, so $I_{compared}+I_{thA}=0.01$ µA, which is positive. Indeed, the photoreceptor current of 1.11 µA exceeds the previous photoreceptor current of 1 µA by more than the opposite value of the first threshold current of $-0.1$ µA.

Conversely, if the value of the resulting electric current has a negative sign, this means that the light impinging on the light-sensitive element 101 has not increased enough with respect to a previous change detection cycle to justify detecting a change, or has decreased.

The current sign detector 51 outputs the result of the comparison on its output 52. The state of the digital storage cell 53 is changed or not depending on the result of the comparison: if a change greater than the first threshold current is detected, the state of the first storage cell 53 is changed to a first state, i.e. to TRUE; conversely if no change greater than the first threshold current is detected, the state of the digital storage cell 53 is unchanged and kept in a second, default state, i.e. FALSE state. The first flag switch $S_A$ is then opened to keep the state of the first storage cell 53.

In step S04, the photoreceptor current $I_{PRout}$ is subtracted from the previous photoreceptor current $I_{PRout, last}$. This is the opposite of step S02. Since the compared electric current $I_{compared}$ corresponding to the difference between photoreceptor current $I_{PRout}$ and the previous photoreceptor current $I_{PRout, last}$ is already stored in the third current memory cell IS3, this compared electric current $I_{compared}$ just have to be written in another memory cell, e.g. the first current memory cell IS1, to change the sign of its value. Accordingly, in step S14, the third current memory cell IS3 is in reading mode while the first current memory cell IS1 is in writing mode. The compared electric current $I_{compared}$ propagates through the analog bus 20 from the third current memory cell IS3 to the first current memory cell IS1, changing the sign of its value. It would also be possible to retrieve the photoreceptor current from the photoreceptor circuit 1 and the previous photoreceptor current $I_{PRout, last}$ from the second current memory cell IS2.

In step S05, the current sign detector 51 compares the value of the compared electric current with a value of a second threshold current stored in a fifth current memory cell IS5. The state of the second digital storage cell 54 will depend from the result of the comparison. To do so, the first current memory cell IS1 and the fifth current memory cell IS5 are in reading mode in order to send to the analog bus 20 the compared electric current of value $-I_{PRout}+I_{PRout, last}$ noted $-I_{compared}$, and the second threshold current of value $I_{thB}$, respectively. The resulting electric current on the analog bus 20 therefore shows a value of $I_{thB}-I_{compared}$. The comparator switch $S_{comp}$ is closed to connect the current sign detector 51 to the analog bus 20. The second flag switch $S_B$ is also closed to connect the second storage cell 54 to the output 52 of the current sign detector 51. If the value of the resulting electric current is positive, $I_{thB}-I_{compared}$ is positive, which means that the value of the compared electric current $I_{compared}$ lower than the value of the second threshold current $I_{thB}$. This means that a negative change between the photoreceptor current and the previous photoreceptor current is greater than the second threshold current, and therefore that the light impinging on the light-sensitive element 101 has decreased enough since a previous change detection cycle. This change is thus detected.

Conversely, if the value of the resulting electric current is negative, it means that the light impinging on the light-sensitive element 101 has not decreased enough with respect to a previous change detection cycle to justify detecting a change, or has increased. For example, with $I_{compared}=0.11$ µA, and $I_{thB}=-0.1$ µA, $I_{thB}-I_{compared}=-0.21$ µA. The resulting electric current is negative, because the photoreceptor current of 1.11 µA is not lower than the previous photoreceptor current of 1 µA by more than the opposite value of the second threshold current of −0.1 µA.

The current sign detector 51 outputs the result of the comparison on its output 52. The state of the second digital storage cell 54 is changed or not depending on the result of the comparison: if a negative change greater than the second threshold current is detected, the state of the second digital storage cell 54 is changed to a first state, i.e. to TRUE; conversely if no negative change greater than the first threshold current is detected, the state of the second digital storage cell 54 is unchanged and kept in a second, default state, i.e. FALSE state. The second flag switch $S_B$ is then opened to keep the state of the second digital storage cell 54.

It shall be noted that the order in which are used the threshold current here is purely illustrative, and that steps S02 and S03 may be performed after steps S04 and S05 if desired. In the numerical example, the threshold currents have the same values, and therefore the first threshold current and the second threshold may be one single threshold current. However, the first threshold current and the second threshold current may have different values, in order to detect differently positive or negative changes. Preferably, the first threshold current and the second threshold current have negative values, because photoreceptor current is positive. However, since it is easy to change the signs of an electric current by using a current memory cell, the skill person would understand that the signs of the currents mentioned in that description may be easily changed individually for each current.

Resulting from steps S03 and S05, the states of the flags A and B have been determined. The address-event representation (AER) circuitry 3 monitors the state of the flags A and B. If one of the storage cells 53, 54 of a pixel circuit 1 turns to TRUE, the AER circuitry 3 can, if other external conditions are met, execute the construction of the array address (i.e. x,y array address) of that particular pixel circuit 1. This address and the information about which flag (A or B) is TRUE can be sent by the AER circuitry 3 to an address readout system. The external conditions may for example depend on the state of the AER circuitry 3, on the result of an external computation or of a measurement.

Readout of the pixel circuit 1 firstly comprises an exposure measurement. Step S06 is the measurement of the photoreceptor current $I_{PRout}$ to determine the exposure measurement of the light-sensitive element 101. It is conditioned by the states of the storage cells 53, 54. The exposure measurement instruction is sent by the controller 2 to all the pixel circuits 1, but only the pixel circuits 1 with a digital storage 53, 54 in a TRUE state execute this readout instruction. Pixel circuits 1 with a digital storage 53, 54 in a TRUE state will be designated as active pixel circuits 1. Execution of the exposure measurement instruction may be further conditioned by other conditions, summarized as a global condition "EM enabled" in FIGS. 5 and 6.

Preferably, an in-pixel calibrated exposure measurement is performed by an active pixel circuit 1. A calibration current is subtracted from the photoreceptor current $I_{PRout}$, and the resulting current is sent to a current readout unit through the analog bus 20. The calibration current is stored in a sixth current memory cell IS6. Storage of the calibration current in the sixth current memory cell IS6 is done during a calibration procedure that can be executed at any time, for example at the beginning of the change detection cycle or previously. Preferably, the calibration procedure is performed by all the pixel circuits 1 at the same time upon instruction from the controller 2.

During a calibration procedure, the switch S2 between the light-sensitive element 101 and the input 102 of the inverting amplifier 103 is opened. The switch S1 of the photoreceptor circuit 10 is closed so that the calibration source 4 is connected to the input 102 instead of the light-sensitive element 101. The calibration source 4 delivers an external reference calibration current $I_{cal}$ to the input 102 which is also the source of the transistor 104. Consequently, the electric current at the output 11 of the photoreceptor circuit 10 is a calibration current $I_{PRout, cal}$ derived from the reference calibration current $I_{cal}$. The front-end switch $S_{PR}$ is closed in order to connect the output 11 to the analog bus 20.

The sixth current memory cell IS6 is in writing mode, and stores the calibration current $I_{PRout,\ cal}$. At the end of the calibration procedure, the switch S1 is reopened and the switch S2 is closed, thus reverting the photoreceptor circuit 10 to its normal configuration.

Since the external reference calibration current $I_{cal}$ travels the same path as the photoreceptor current $I_{PRout}$ to become the stored calibration current $I_{PRout,\ cal}$, the stored calibration current $I_{PRout,\ cal}$ of a pixel circuit 1 reflects the variations of the electrical characteristics of that particular pixel circuit 1 that could impact the photoreceptor current $I_{PRout}$. As a result, the calibration current $I_{PRout,\ cal}$ of a pixel circuit 1 is unique and specific to each pixel circuit 1 since the properties of the components of a pixel circuit 1 vary from one pixel circuit 1 to another pixel circuit 1, in particular because of the photoreceptor circuits 10. This is called device mismatch. Subtracting the calibration current $I_{PRout,\ cal}$ from the photoreceptor current $I_{PRout}$ allows removing the effects of device mismatch from the exposure measurement results. In particular, with a logarithmic photoreceptor as the one depicted in FIG. 4, the exposure measurement results may suffer from large errors due to device mismatch, amplified by the logarithmic nature of the response.

There is no need for writing a new calibration current for each change detection cycle or readout, and a same calibration current may be used during several change detection cycles or exposure measurements. The calibration current stored in the sixth current memory cell IS6 is however preferably updated frequently enough to reflect the variation of the factors influencing the pixel circuit 1 (temperatures, interferences, etc.).

For performing the calibrated exposure measurement, the sixth current memory cell IS6 is in reading mode and the front-end switch $S_{PR}$ is closed, so that the resulting current in the analog bus 20 is the readout current $I_{PRout}-I_{PRout,\ cal}$ (step S16). When the readout switch $S_{ro}$ is closed, the analog bus 20 is connected to the current readout unit, and the readout current is sent to said current readout unit, through an Current-to-voltage (I/V) converter and/or an analog-to-digital converter (ADC). The pixel circuit 1 is thus read.

At least the closure of the readout switch $S_{ro}$ is not performed by all the active pixel circuits 1 at the same time. The active pixel circuits 1 are sequentially selected to be read. Active rows, i.e. rows with at least one active pixel circuit 1, are for example first selected. The active rows may be selected by scanning each row to detect the presence of an active pixel circuit 1 or directly selected by an AER arbiter of the AER circuitry 3 based on the addresses of the active pixel circuits 1 determined through the monitoring of the states of the flags A and B.

For each selected row, each active pixel circuit 1 is then read by closing the readout switch $S_{ro}$. This can be done on a column-by-column basis (i.e. active column that have at least one active pixel circuit 1) or in parallel for all active rows if a column reader is provided (in particular with a column I/V converter and/or a column ADC). Alternatively, with a column-wise readout, all active pixel circuits 1 per row may be read in parallel.

If a first approach, all the active pixel circuits 1 of the image sensor are read before resuming or restarting the change detection cycle. This results in a non-uniform "frame rate" in the sense that the duration of the readout procedure, and further the duration of the change detection cycle, depends on the number of active pixel circuits 1, i.e. the number of pixel circuits 1 that detected a change and set their flags to TRUE. Accordingly, the frame rate depends on the activity of the scene acquired by the event-based image sensor, i.e. how the light changes.

In a second approach, all the active pixel circuits 1 are not necessarily read before resuming or restarting the change detection cycle. The change detection cycle may be restated or resumed before every active pixel circuits 1 have been read, for example after a certain amount of time has passed or after a certain amount of pixel circuits 1 have been read. The amount of time allocated to the readout may be fixed (i.e. fixed "frame-rate"), or may varies. Similarly, the number of active pixel circuits 1 that have been read may be fixed (i.e. fixed "frame-rate"), or may varies.

It is also possible to combine the two approaches, for example by resuming or restarting the change detection cycle either when all the active pixel circuits 1 have been read or when a certain amount of time has passed (a certain amount of pixel circuits 1 have been read) if there are too many pixel circuits to read.

In step S07, if one of the flags of the pixel circuit 1 is set at TRUE, i.e. if one of the storage cell 53, 54 is in the first state, the photoreceptor current $I_{PRout}$ replaces the previous photoreceptor current $I_{PRout,\ last}$ to be used as a new previous photoreceptor current for a new change detection cycle. To do so, the photoreceptor current $I_{PRout}$ is written in the second current memory cell IS2.

To avoid changing the sign of the value of the photoreceptor current $I_{PRout}$ the photoreceptor current $I_{PRout}$ is firstly written in another memory cell. For example, in step S17 the front-end switch $S_{PR}$ is closed to connect the output 11 of the photoreceptor circuit 10 the analog bus 20 to make the photoreceptor current $I_{PRout}$ available on the analog bus 20. The first current memory cell IS1 is in writing mode and writes the photoreceptor current $I_{PRout}$. The front-end switch $S_{PR}$ is then opened, and the first current memory cell IS1 enters reading mode while the second current memory cell IS2 enters writing mode. The photoreceptor current $I_{PRout}$ is transferred from the first current memory cell IS1 into the second current memory cell IS2. By doing so, the sign of the value of the photoreceptor current $I_{PRout}$ would be changed twice when read again. The electric current stored in the second current memory cell IS2 will be used as the previous photoreceptor current $I_{PRout,\ last}$ during the next change detection cycle of the pixel circuit 1.

Rather than expressly using the photoreceptor circuit 10 again to get the photoreceptor current $I_{PRout}$, it is possible to use electric currents already stored in current memory cells. For example, the compared electric current $I_{compared}$ and its opposite $-I_{compared}$ stored in the first current memory cell IS1 and in the third current memory cell IS3 can be used to retrieve the photoreceptor current $I_{PRout}$ because they correspond to $\pm(I_{PRout}-I_{PRout,\ last})$. The photoreceptor current $I_{PRout}$ may also be stored during the exposure measurement in a current memory cell that is no longer of use in that change detection cycle such as the first current memory cell IS1 or the third current memory cell IS3.

Finally, in step S08 at the end of the change detection cycle, the flags are cleared, i.e. reset to the default state FALSE. A reset signal rst is sent (step S18) to the storage cells 53, 54 to force them into the second state (i.e. False). If all the active pixel circuits 1 were read, all the flags can be cleared and the reset signal rst can be sent by the controller 2 to all the pixel circuits 1.

However, if some active pixel circuits 1 were not read during the readout procedure, for example because the time allocated to do so has elapsed, it is preferable not to clear the flags of unread active pixel circuits 1. Accordingly, the reset signal rst can be selectively sent to each pixel circuit 1 that is read during the readout procedure. Unread active pixel circuits 1 therefore stay active, i.e. with their flags in the state TRUE, and will be read during the next readout procedure. Preferably, active pixel circuits 1 are not read in the same order during subsequent readout procedures, so that the active pixel circuits 1 that were not read a readout procedure will be the first ones to be read during the next readout procedure.

Similarly, step S07 is preferably not performed by the active pixel circuits 1 that were not read during the readout procedure, but performed only by active pixel circuits that were read during readout procedure. This can be done by performing step S07 as part of the readout procedure.

In the change detection cycle described herein above, the current comparator 50 comprises two storage cells 53, 54: the state of the first storage cell 53 representative of an increase in the value of the photoreceptor current, the state of the second storage cell 54 representative of a decrease in the value of the photoreceptor current. Accordingly, the AER circuitry 3 may determine through the monitoring of the state of the storage cells 53, 54 how the photoreceptor current has changed: with an increase event or a decrease event (no event means no change). However, it is possible to have only one storage cell connected to the current sign detector 51. In this case, the AER circuitry 3 could only determine that a change has occurred in the photoreceptor current of a pixel circuit 1. This may be sufficient since the detection of a change is mainly used for determining the address of the pixel circuit 1 and for conditioning the readout of the pixel circuit 1. In the operating method, a second comparison between a value of a compared electric current flowing in the analog bus with a value of a threshold current could be conditioned by the state of the unique flag. Indeed, it the state of the flag has been changed in the first comparison, there is no need to do the second comparison. It is also possible to have a second comparison conditioned by the state of the first storage cell 53 in the case with two storage cells 53, 54.

While the present invention has been described with respect to certain preferred embodiments, it is obvious that it is in no way limited thereto and it comprises all the technical equivalents of the means described and their combinations. In particular, it will be apparent to those skilled in the art that various changes and modifications may be made without departing from the scope of the invention as defined in the appended claims.

The invention claimed is:

1. An event-based image sensor comprising a controller, an address-event representation circuitry, and a plurality of pixel circuits forming a pixel array, the controller connected to each pixel circuit to control said pixel circuits, each pixel circuit comprising:
    a photoreceptor circuit comprising a light-sensitive element and an output, said photoreceptor circuit being configured to deliver at said output a photoreceptor current derived from a light impinging on the light-sensitive element;
    an analog bus selectively connected to a readout unit, the output of the photoreceptor circuit being selectively connected to said analog bus; and
    a plurality of current memory cells connected to the analog bus, each current memory cell being adapted to selectively store an electric current flowing in the analog bus and to selectively deliver into said analog bus an electric current stored within said current memory cell;
    wherein each pixel circuit further comprises a current comparator configured to detect a change in the photoreceptor current, said current comparator comprising:
        a current sign detector connected to the analog bus and configured to determine a sign of a value of an electric current flowing in the analog bus resulting from a compared electric current and a threshold current, said compared electric current resulting from a difference between at least the photoreceptor current and a previous photoreceptor current stored in a current memory cell; and
        at least one storage cell connected to an output of the current sign detector and having a state conditioned by the output of said current sign detector, the state of said at least one storage cell being representative of a change between the photoreceptor current and the previous photoreceptor current greater than the threshold current;
    wherein said at least one storage cell is connected to the address-event representation circuitry so that the address-event representation circuitry monitors the state of the storage cell to determine a change in the light impinging on the light-sensitive element; and
    wherein a readout of a pixel circuit through the connection of the analog bus to the readout unit is conditioned by the state of said at least one storage cell.

2. The event-based image sensor of claim 1, wherein the current comparator comprises a first storage cell and a second storage cell, each of the storage cells being connected to the output of the current sign detector and having a state conditioned by the output of said current sign detector, the state of the first storage cell representative of a value of the compared electric current greater than a value of a first threshold current, the state of the second storage cell representative of a value of the compared electric current lower than a value of a second threshold current.

3. The event-based image sensor of claim 1, wherein the compared electric current is obtained when a current memory cell storing the photoreceptor current is connected to a current memory cell storing the previous photoreceptor current to the analog bus, the compared electric current being stored into a current memory cell, the threshold current being stored in another current memory cell.

4. The event-based image sensor of claim 1, wherein the address-event representation circuitry is configured to determine, upon detection of a change in a state of a storage cell of a pixel circuit, an address of the pixel circuit whose storage cell has changed state.

5. The event-based image sensor of claim 1, wherein the controller is configured to send instructions to the pixel circuits, and wherein execution of at least one instruction by a pixel circuit is conditioned by a state of at least one storage cell.

6. The event-based image sensor of claim 1, wherein the photoreceptor circuit of a pixel circuit is a logarithmic photoreceptor circuit and the photoreceptor current is proportional to a logarithm of the light impinging on the light-sensitive element.

7. The event-based image sensor of claim 1, further comprising a calibration current source, wherein the photoreceptor circuit of each pixel circuit is configured to deliver at the output of said photoreceptor circuit a calibration current derived from a reference calibration current supplied by the calibration current source during a calibration procedure.

8. The event-based image sensor of claim 1, wherein a current memory cell of the plurality of current memory cells comprises a transistor and a capacitor, wherein a first terminal of the capacitor is connected to a ground, and a second terminal of the capacitor is connected to a gate of the transistor.

9. The event-based image sensor of claim 8, wherein the second terminal of the capacitor is further connected to a drain of the transistor through a gate switch, the drain of the transistor is connected to the analog bus through a drain switch, and the drain of the transistor is further connected to a current source providing a reference current.

10. The event-based image sensor of claim 8, wherein
when the drain switch and the gate switch are closed, the electric current flows from the analog bus to the capacitor through the transistor;
when the drain switch and the gate switch are open, the electric current is stored in the current memory cell to keep a constant voltage at the capacitor; and
when the gate switch is open and the drain switch is closed, the stored electric current flows from the capacitor to the analog bus.

11. A method of operating an event-based image sensor, the event-based image sensor comprising a controller, an address-event representation circuitry, and a plurality of pixel circuits forming a pixel array, the controller connected to each pixel circuit to control said pixel circuits, the method comprising:
detecting, with a change detection cycle, a change in light impinging onto a light-sensitive element of a photoreceptor circuit of a pixel circuit, said change detection cycle comprising:
delivering, with the photoreceptor circuit, a photoreceptor current derived from a light exposure of the light-sensitive element at the output of said photoreceptor circuit;
storing the photoreceptor current in a first current memory cell;
storing a compared electric current, resulting from a difference between the photoreceptor current and a previous photoreceptor current, in a second current memory cell;
comparing, with a current sign detector configured to determine a sign of a value of an electric current, a value of the compared electric current with a value of a threshold current, and if the value of the compared electric current is above the value of the threshold current, setting the state of a digital storage cell to a first state;
if the storage cell is in the first state, reading out the photoreceptor current, storing the photoreceptor current in the second current memory cell, and setting the state of the storage cell to a second state.

12. The method of claim 11, wherein a current comparator of the pixel circuit comprises a first storage cell and a second storage cell, each connected to the output of a current sign detector of the current comparator and having a state conditioned by an output of said current sign detector.

13. The method of claim 12, wherein the state of the first storage cell is representative of a value of the compared electric current greater than a value of a first threshold current, and the state of the second storage cell is representative of a value of the compared electric current lower than a value of a second threshold current.

14. The method of claim 13, wherein comparing, with the current sign detector, the value of the compared electric current with the value of the threshold current comprises:
comparing, with the current sign detector, a value of the compared electric current with a value of a first threshold current stored in a fourth current memory cell, and if the value of the compared electric current is above the value of the first threshold current, setting the state of the first storage cell to a first state; and
comparing, with the current sign detector, a value of an opposite of the compared electric current with a value of a second threshold current stored in a fifth current memory cell, and if the value of the opposite of the compared electric current is above the value of the second threshold current, setting the state of the second storage cell to a first state.

15. The method of claim 14, further comprising a calibration procedure executed before the readout of the photoreceptor current being performed if the storage cell is in the first state, said calibration procedure comprising:
connecting a calibration current source instead of a light-sensitive element in a photoreceptor circuit of a pixel circuit so that the photoreceptor circuit of the pixel circuit delivers at the output of said photoreceptor circuit a calibration current derived from a reference calibration current supplied by the calibration current source; and
transferring the calibration current from the output of said photoreceptor circuit to a sixth current memory cell where said calibration current is stored.

16. The method of claim 15, wherein during a readout of a pixel circuit, the calibration current stored in the sixth current memory cell is subtracted from the photoreceptor current.

17. The method of claim 11, wherein during a readout procedure of the pixel array, only pixel circuits having a storage cell in a first state are selected to have their photoreceptor current read.

* * * * *

UNITED STATES PATENT AND TRADEMARK OFFICE
CERTIFICATE OF CORRECTION

PATENT NO. : 11,317,045 B2
APPLICATION NO. : 16/771665
DATED : April 26, 2022
INVENTOR(S) : Christoph Posch et al.

It is certified that error appears in the above-identified patent and that said Letters Patent is hereby corrected as shown below:

On the Title Page

Item (30), under "Foreign Application Priority Data," "17306740" should read --17306740.6--.

In the Claims

Claim 11, Column 17, Line 46, "the state of a digital storage cell" should read --the state of a storage cell--.

Signed and Sealed this
Twentieth Day of September, 2022

Katherine Kelly Vidal
*Director of the United States Patent and Trademark Office*